UNITED STATES PATENT OFFICE.

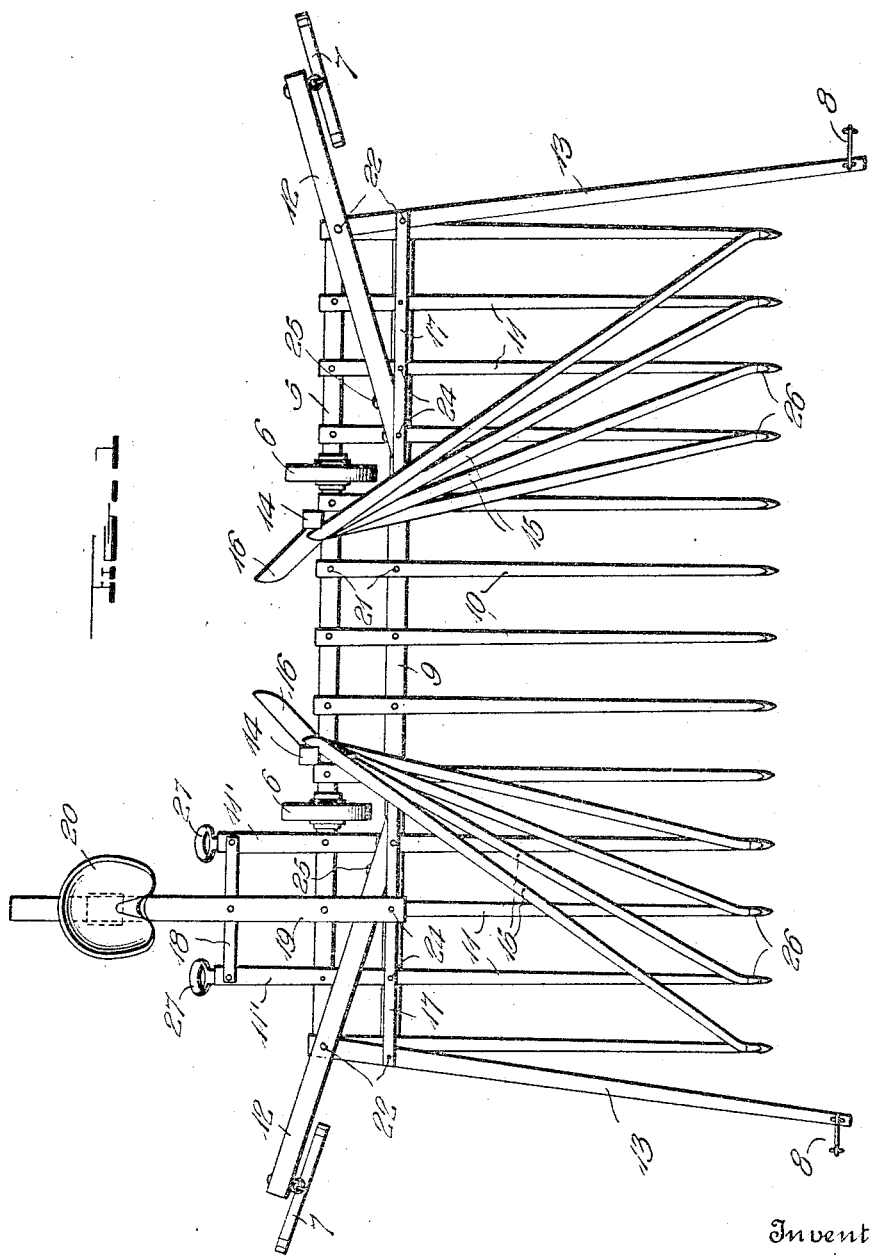

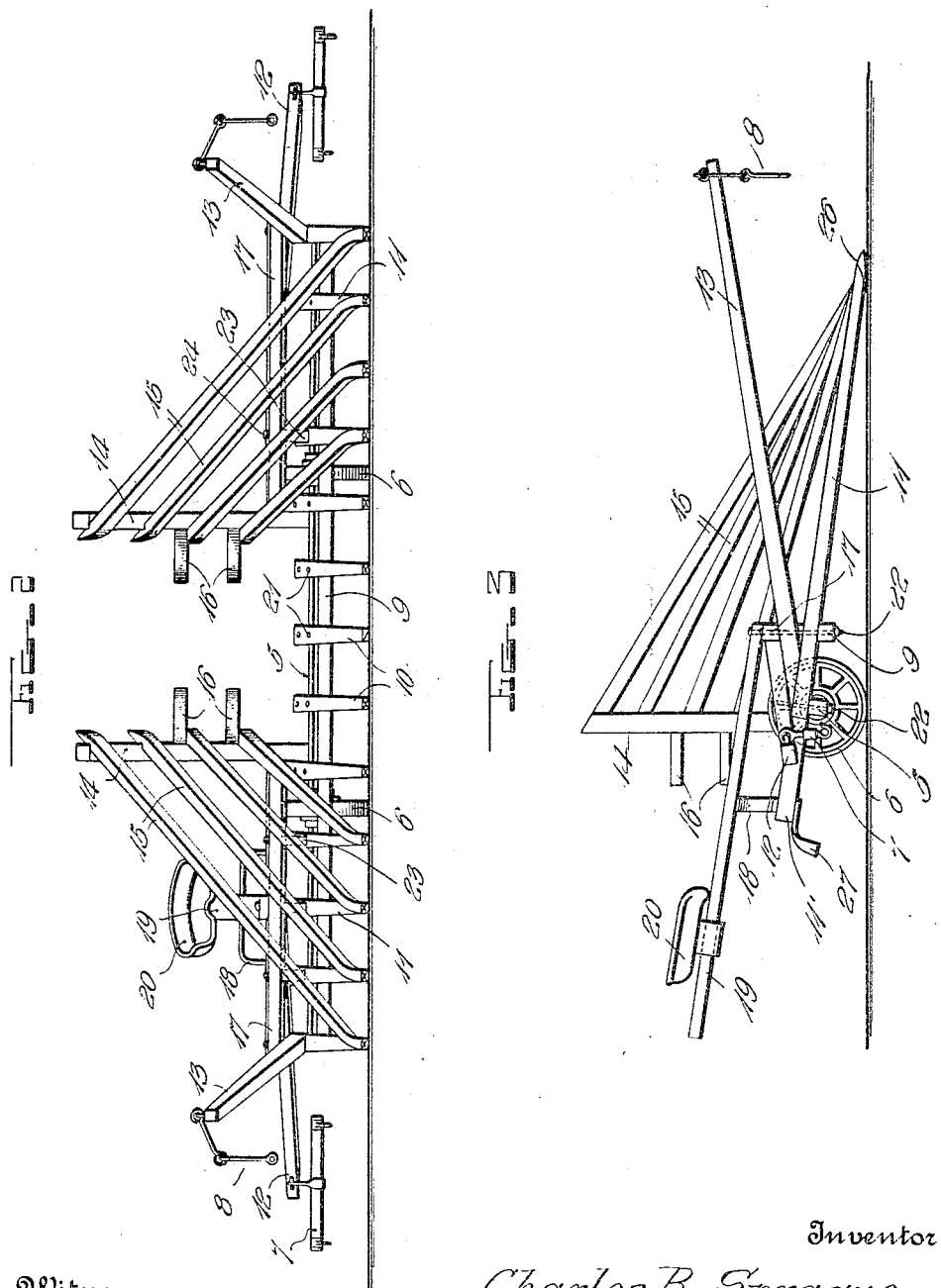

CHARLES R. SPRAGUE, OF BLANCHARD, IOWA.

CENTER-DELIVERY HAY-RAKE.

1,288,249.

Specification of Letters Patent.

Patented Dec. 17, 1918.

Application filed February 14, 1918. Serial No. 217,120.

*To all whom it may concern:*

Be it known that I, CHARLES R. SPRAGUE, a citizen of the United States, residing at Blanchard, in the county of Page and State of Iowa, have invented certain new and useful Improvements in Center-Delivery Hay-Rakes; and I do declare the following to be a full, clear, and exact description of the invention, such as will enable others skilled in the art to which it appertains to make and use the same.

This invention relates to horse-rakes and it relates more particularly to an improved hay-rake and windrow-forming implement.

The primary object of this invention is to provide a horse-rake or hay-rake which draws the hay to its rear central part and delivers the hay through said rear central part, so as to form a continuous windrow which is relatively high and narrow.

Another object is to provide a rake of this character which raises the mass of hay from its relatively flat and scattered position and turns the hay through only such part of a revolution as to insure the complete inversion from its original flat position, as left by the mower, to its windrowed position; thereby exposing its moist portions to the curing action of the air and sun.

Another object is to provide a hay-rake or windrow-forming device that combines the maximum of strength, rigidity and practicability with the minimum of expense in its manufacture and upkeep.

Other objects and advantages may become apparent to persons who read the following details of description in connection with the accompanying drawings in which:

Figure 1 is a top plan view of an embodiment of my invention;

Fig. 2 is a front elevational view; and,

Fig. 3 is a side elevational view.

Referring to these drawings in detail, in which similar reference characters correspond with similar parts throughout the several views, it is pointed out that the device consists mainly in a rigid frame structure which is supported on wheels and adapted to be drawn by means of horses or other draft animals. This frame structure comprises a main beam or axle 5 around which a pair of ground-wheels 6 rotate as the rake is drawn forward by means of draft animals which may be hitched to the whiffletrees 7 and to the tongue connections 8. The axle 5 coöperates with the wheels 6 for supporting all the other elements of the device, including a beam 9, tines 10 and 11, bars 12, tongues 13, standards 14, hay guides 15, compressing elements 16, supporting and bracing elements 17, 18 and 19, and a driver's seat 20.

The beam 9 is in parallel and spaced relation to the beam 5, being located in front of said beam 5 and supporting the intermediate parts of the tines 10 and 11, while the rear parts of the tines 10 are supported by the beam 5, bolts or other securing elements 21 being employed for securing the tines to the beams 5 and 9. The tongues 13 have their rear ends secured to the outer tines and to the ends of the beam 5 by means of bolts 22 which are longer than the bolts 21. Each of these bolts 22 extends through one of the elements 12, one of the elements 13, one of the elements 10 and through the beam 5, so as to rigidly unite these elements.

In order that the draft elements 12 may also serve as diagonal braces, so as to give the frame structure the maximum rigidity, each of these bars or draft elements 12 extends inward and forward from one end of the beam 5 and has its rear end connected to the beam 9 through the medium of one of the bars 17 and short posts or blocks 23. These blocks being secured in place by means of bolts 24 which extend therethrough and through the elements 9 and 17, while the inner ends of the bars 12 are secured to the bars 17 by means of bolts 25. It will be seen, therefore, that the members 12 perform the dual functions of bracing the frame structure and supporting the whiffletrees, or acting as draft elements.

The standards 14 have their lower ends secured to the axle 5 between the wheels 6, or substantially at the middle portion of the axle 5, these standards being spaced from one another a distance sufficient to allow as much hay to pass therebetween as may be gathered at one operation by the tines 10 and 11. In order that the hay may be properly guided, concentrated and turned from its scattered condition, to form a windrow thereof, I arrange the guides or bars 15 with their front ends secured respectively to one of the tines 10 or 11, as indicated at 26, while the rear ends of these bars are secured to the standard 14 by any appropriate means. Although I may employ any appropriate means for securing the tines and bars 15 together at 26. I preferably provide a suitable tine point of cast iron or the like and provide these tine points with sockets which receive the front ends of the tines and guide bars.

It will be seen that I provide two complemental hay-lifting and guiding devices comprising the two sets of guide bars 15, each set being arranged laterally of the center of the rake, so that the hay is guided thereby over the rear central portion of the rake. It will also be seen that the lower bars 15 are connected to one of the tines near the center and the next higher bar 15; and it will also be noted that the front ends of the guides 15 are arranged in the same horizontal plane, while the rear ends of each set of guide bars are arranged in the same vertical plane, the rear ends of all the bars of both sets being arranged in a common vertical plane at right angles to the vertical plane just previously mentioned, and it will be seen, therefore, that as the mass of hay is raised from its flat and scattered condition, the edges of the mass of hay are gradually turned so that the under side thereof becomes substantially vertical as the mass passes between the rear end of the guides 15. Moreover, it will be seen that the outer guide bars 15 have a greater inclination rearwardly than the inner ones have, and therefore, the mass of hay is separated to some extent as it passes rearwardly with relation to the guide bars, thereby transforming the mass from a relatively low and wide mass to a relatively high and narrow mass, so that the windrow is formed with the minimum of ground contact and the maximum of air contact.

In order to intensify the result described in the foregoing paragraph, elements 16 are provided. These elements are supported by the standards 14 and extend rearwardly and inwardly therefrom, the extent of their rearward convergence being greater than that of the guiding means 15. The bar 19 is secured to the bar 18 and one of the bars 17 and extends rearwardly beyond the shaft or beam 5. The bar 18 is secured to the rear extensions 11' of the tines 11. On the rear end of each of the tines 11 is secured a stirrup 27, in which the driver places his feet while sitting in the seat. These stirrups are preferably formed of rigid material and are of such shape that the driver may engage the same with his feet so as to pull the seat 20 forwardly on the bar 19, and it will be seen that the seat is dished or cupped upwardly so as to receive the body of the driver, while the forward portion of the seat is somewhat choked so as to prevent the body of the driver from becoming disengaged with the seat when he shifts his body forwardly. Moreover, it is obvious that the seat 20 may be shifted rearwardly by the driver pushing against the stirrups 27, and that by thus shifting the seat he adjusts the same to suit the length of his legs.

It will be seen that there are two complemental sets of the bars 15, each set being united with its contiguous upright 14; and each of these two combinations of elements constitutes a hay-lifting and guiding device which coöperates with its complemental device in lifting the hay from the stubble while concentrating it into a windrow which it deposits on the stubble rearward of the machine. The beam 5 and wheels 6 are common to these devices for supporting them in rearwardly converging relation to one another, and the upper and lower parts of their rear ends lie in a common vertical plane which is parallel with the axes of the wheels 6.

From the foregoing, it will be seen that I have provided a very practical and thoroughly effectual device for forming windrows of hay or other mowed farm products. and such a device should meet with great favor among users of such devices.

Although I have described this embodiment of my invention in minute detail I do not limit my invention to these exact details of construction and arrangements of parts, but my invention is susceptible of such minor changes that do not constitute a departure from the inventive idea disclosed in the foregoing and in the following claims:

I claim:

1. In a device for forming windrows, a pair of hay-lifting and guiding devices having front and rear ends, the front end of each of said guiding devices extending horizontally in a plane common to both of these front ends, the rear ends of these guiding devices extending substantially vertically and being spaced from one another, said devices being convergent from their horizontal front ends to their spaced and vertically extending rear ends, the bottom and top parts of said rear ends terminating substantially in a plane that is common to both of said rear ends, and means common to said devices for supporting them in movable relation to the hay to be windrowed.

2. In a device for forming windrows, a pair of sets of hay-lifting and guiding bars having front and rear ends, the front ends of the bars of said sets being arranged substantially in the same horizontal plane, the rear ends of the bars of each set being arranged substantially in a vertical plane, the rear ends of the bars of both sets being arranged substantially in a vertical plane at right angles to the first said vertical plane, the vertically arranged rear ends of one set being spaced from the vertically arranged rear ends of the other set, and means common to said sets of bars for supporting and carrying them.

3. In a device for forming windrows, a pair of hay-lifting and guiding devices having front and rear ends, the front ends of said guiding devices extending horizontally in a plane common to both of these front ends, the rear ends of these guiding devices extending substantially vertically and being spaced from one another, said devices being convergent from their horizontal front ends to their spaced and vertically extending rear ends, the bottom and top parts of said rear ends terminating substantially in a plane that is common to both of said rear ends, a hay lifting element arranged at the bottom of the space between said lifting and guiding devices and having its front end substantially in horizontal alinement with the front ends of said devices, and supporting and carrying means common to said devices and lifting element and extending thereunder and being movable therewith.

4. The combination with a hay rake comprising a horizontal beam, tines having their rear ends secured to said beam and extending forward at right angles to said beam and terminating substantially in a line that is common to all of these front ends; of a pair of hay guiding devices having their front ends disposed on certain spaced groups of said tines and extending horizontally in a plane common to both of these front ends, the rear ends of said devices extending upward from said tines and being spaced from one another and being arranged substantially in parallel vertical planes which extend in the longitudinal direction of the tines.

5. In a hay rake, a main frame comprising a horizontal beam, tines secured to said beam and extending forward therefrom, a pair of standards connected to and extending up from said beam, and a plurality of sets of hay-guiding bars, each hay-guiding bar of one of said sets having its front end secured to the front end of a corresponding one of said tines and extending upward and rearward therefrom and converging with relation to the corresponding bar of the other set, each of these bars having its rear end secured to one of the standards of said pair, the rear ends of the bars of each of said sets being substantially vertically alined, the front ends of the bars of each of said sets being substantially horizontally alined.

6. In a hay rake, a main frame comprising a horizontal beam, a horizontally disposed series of spaced tines secured to said beam and extending forward therefrom, a pair of standards connected to and extending up from said beam in spaced relation to one another, a plurality of sets of hay-guiding bars, each hay-guiding bar of one of said sets having its front end secured to the front end of a corresponding one of said tines and extending upward and rearward therefrom and being convergent with relation to the tines of the other set and having its rear end secured to one of said standards, draft elements connected to said beam and extending forward therefrom, and wheels supporting said beam and axially alined therewith.

7. In a hay rake, a rigid main frame comprising a horizontal beam, tines secured to said beam and extending forward therefrom, a second horizontal beam in front of and in spaced and parallel relation to the first said beam and coöperating with the first said beam for supporting said tines, forwardly extending draft elements each having its rear end connected to one end of the first said beam, and a pair of draft elements each having its intermediate portion secured to one end of the first said beam and having its outer end extending beyond the said end of the latter, the inner end portion of each of said draft elements crossing the space between the first and second said beams and having its inner end rigidly secured with relation to the said beams, and means coöperative with said tines and with one of said beams for concentrating into a windrow the hay engaged by said tines and for depositing the windrow rearwardly of the hay-rake while the rake is being moved forward.

8. In a windrow-forming device, a horizontal beam, tines supported by and extending forward from said beam, a pair of standards supported by and extending upward from said beam, a pair of upwardly and rearwardly converging hay-guides each having its rear end portion supported by one of said standards, and a pair of rearwardly converging elements each supported by one of said standards and extending rearward therefrom and adapted to concentrate the hay as it emerges from the device in the form of a windrow.

In testimony whereof I have hereunto set my hand in the presence of two subscribing witnesses.

CHARLES R. SPRAGUE.

Witnesses:
S. H. COLEMAN,
F. L. INGMAN.

Copies of this patent may be obtained for five cents each, by addressing the "Commissioner of Patents, Washington, D. C."